United States Patent [19]
Matsumoto

[11] Patent Number: 5,835,765
[45] Date of Patent: *Nov. 10, 1998

[54] COMPUTER OPERATION MANAGEMENT SYSTEM FOR A COMPUTER OPERATING SYSTEM CAPABLE OF SIMULTANEOUSLY EXECUTING PLURAL APPLICATION PROGRAMS

[75] Inventor: Hajime Matsumoto, Itami, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 539,007

[22] Filed: Oct. 4, 1995

[30] Foreign Application Priority Data

May 31, 1995 [JP] Japan .................................. 7-133920

[51] Int. Cl.$^6$ ...................................................... G06F 9/46
[52] U.S. Cl. ........................... 395/672; 395/674; 395/677
[58] Field of Search ..................................... 395/650, 672, 395/674, 677; 364/281.7, 281.8, 281.4, 281, 281.6, 284.3, 285.3, 286.4, 265

[56] References Cited

U.S. PATENT DOCUMENTS

| | | | |
|---|---|---|---|
| 4,318,173 | 3/1982 | Freedman et al. ...................... | 364/200 |
| 4,493,020 | 1/1985 | Kim et al. ................................ | 364/200 |
| 4,845,644 | 7/1989 | Anthias et al. .......................... | 364/521 |
| 5,210,872 | 5/1993 | Ferguson et al. ........................ | 395/650 |
| 5,421,011 | 5/1995 | Camillone et al. ...................... | 395/650 |
| 5,437,032 | 7/1995 | Wolf et al. ............................... | 395/650 |
| 5,440,726 | 8/1995 | Fuchs et al. .......................... | 395/82.18 |
| 5,442,791 | 8/1995 | Wrabetz et al. ......................... | 395/650 |
| 5,465,354 | 11/1995 | Hirosawa et al. ...................... | 395/650 |
| 5,485,626 | 1/1996 | Lawlor et al. ........................... | 395/650 |
| 5,495,606 | 2/1996 | Borden et al. ........................... | 395/600 |

OTHER PUBLICATIONS

Lawrence J. Kenah et al., "VAX.VMS Internals and Data Structures", Digital Press, 1984, pp. 3–12, 183–188, 443–517 and 704–704.

Gendreav et al, Cooperative Self Scheduling In Message Passing Parallel Systems, IEEE Conf. Proceed. 1989, pp. 496–499.

Gendreav, Process Management Issues In Message–Based Multiprocessors, IEEE Conf. Proceed. 1988, pp. 103–107.

Stumm, The Design and Implementation of a Decentralized Scheduling Facility For A Workstation Cluster, Comp. Workstations Conf. 1988 pp. 12–22.

*Primary Examiner*—Lucien U. Toplu
*Attorney, Agent, or Firm*—McDermott, Will & Emery

[57] ABSTRACT

A computer operation management system comprises a computer having a central processing unit, a main memory and, an auxiliary memory, an operating system for operating the computer so as for the computer to execute plural application, programs simultaneously and a process manager for monitoring an execution status of plural application programs to control the number of application programs simultaneously executed and their execution priorities.

11 Claims, 14 Drawing Sheets

Fig.9

Definition of error recovery procedure

| Prog.category | Measure for error | Procedure | Alarm | Mail | Related program | Processing of related program |
|---|---|---|---|---|---|---|
| Appl. 1 | no | no | yes | no | Group 1 | no |
| Appl. 2 | recovery process | Proc. 1 | yes | mail | no | Processing 4 |
| Appl. 3 | forcibly ending | Proc. 7 | no | mail | Group 2 | Processing 7 |

COMPUTER OPERATION MANAGEMENT SYSTEM FOR A COMPUTER OPERATING SYSTEM CAPABLE OF SIMULTANEOUSLY EXECUTING PLURAL APPLICATION PROGRAMS

BACKGROUND OF THE INVENTION

1. Field of the invention

The present invention relates to a system enabling high reliability execution and high speed processing of plural application programs executing on a single computer or on plural computers over a network, and relates particularly to a stable operation management system for computers.

2. Description of the prior art

Conventional computer systems comprise hardware such as the memory, disk drives, central processing unit (CPU), and network devices, operating system software enabling the hardware to be used effectively, and programs recording the procedures to be executed by the computer to accomplish specific tasks. The person using the computer typically executes application programs written in a programming language by the programmer by instructing the operating system software to execute, or "run", the desired application program by some means. The operating system then executes the one requested program, or simultaneously executes plural programs, by effectively using the memory (primary storage means), disk drive (complementary storage means), CPU, and network devices available to the computer. Some of the de facto standard, operating systems in use today include MVS used on mainframe computers, VAX used on minicomputers, UNIX used on workstations, and MS-DOS and Windows used on personal computers.

Of these common operating systems, UNIX is capable of simultaneously executing plural application programs.

UNIX was originally developed by AT&T of the United States, and is widely used on primarily workstations today. Originally designed for software development, computer-aided design (CAD), and other technical applications run by engineers, UNIX offers the following features in comparison with the other operating systems mentioned above.

(1) UNIX can simultaneously execute plural application programs in parallel.

(2) One program executing under UNIX can cause another program to be run under UNIX, and the number of simultaneously executing programs can increase without being limited by the operating system.

(3) Simultaneously executing programs are handled equally and execute with the same priority unless one or more programs is specified to execute with precedence (priority) over another program(s). The priority of executing programs can also be changed dynamically.

(4) Because the virtual storage area has a finite size, attempts to execute a program exceeding this limit will cause the program to end immediately and an error to be generated (an "abnormal end").

The problem with UNIX is that the number of application programs simultaneously executable on a single computer cannot be limited. As a result, when the number of simultaneously executing programs exceeds the projected limit, the capacity of the main storage device (memory) becomes insufficient. When memory becomes insufficient, additional virtual storage area is reserved on the complementary storage device (disk drive), and the data in memory is written to disk. When the virtual storage area (virtual memory) is used for program execution, however, the executing speed of the program drops by several ten to several hundred percent. With some application programs it is merely inconvenient when the execution speed drops, but with systems requiring real-time performance, reduced execution speed can become a source of trouble.

When both hardware memory and virtual memory are insufficient, UNIX forcibly terminates one of the executing programs. Because it is not possible to specify the order (precedence) in which programs are forcefully terminated, programs for which reliability is essential and programs for which reliability is non-essential will be forcibly terminated with the same probability. When any program is forcibly terminated, system functionality is also lost.

UNIX also does not have any means of centrally managing what changes have occurred in any program, when those changes occurred, and what error messages were generated when a program starts up, terminates normally, or terminates abnormally. As a result, when a system error or problem develops, there is no way to determine what program was the source of the problem. While some error messages are output, the messages are not unified by machine (CPU), output device, or output method, and troubleshooting is therefore difficult and time-consuming.

UNIX also handles each of the plural simultaneously executing programs equally, and is not able to control the execution time (CPU time) allocated to each program. As a result, programs that make unusually heavy demands on the CPU or memory degrade the overall response time and throughput of the system.

In large-scale systems linking UNIX-based computers via a common network, the problems described above can occur frequently, and tracing the source of the problem is even more complicated. There is also no means of immediately notifying the operator that one of aforementioned problems has occurred, and recovery efforts are therefore delayed.

SUMMARY OF THE INVENTION

Therefore, an object of the present invention is to provide a computer operation management system that operates on an operating system, such as UNIX, having the aforementioned problems.

To achieve the aforementioned object, a computer operation management system according to the present invention enables stable and high reliability execution of individual application programs by limiting the number of simultaneously executable application programs currently executing, and monitoring application program execution, computer resources, and the network in a computer operating system capable of simultaneously executing plural applications programs.

A computer operation management system according to first aspect of the invention resides between the operating system and the simultaneously executing application programs has an interface to both the operating system and the individual application programs, and appears to the operating system to be a single application program. This computer operation management system comprises a program definition file predefined by the user to record the maximum number of simultaneously executable programs for each program category, the execution priority of the program, the error recovery procedure, programs that execute by communication with other programs on the network, and information about the post-process to be executed after the program terminates; a queued program record file for recording the information of queued programs waiting to be executed; and a log file for recording log data when a program starts or ends, and when an error occurs.

A computer operation management system according to second aspect of the invention manages and controls the execution status of application programs by executing application programs to be managed in a manner enabling direct communication with or direct management by one operation management program for managing the operation of them.

A computer operation management system according to third aspect of the invention achieves the application program control method by means of: a program definition file for recording the maximum number of simultaneously executing programs for each program category or computer as defined bit the user; an execution controller for effectively using computer resources and achieving stable application program operation during simultaneous execution of plural programs by limiting for the operating system at application program startup the number of executing programs by program category or computer based on the maximum number of simultaneously executable programs read from the program definition file; a queued program record file for temporarily storing the data of programs which cannot be currently simultaneously executed to enable the queued program to be started after a predetermined period; and a log file for recording after program startup a startup log containing the name of the started program, the time and date, and the computer name.

A computer operation management system according to fourth aspect of the invention achieves the application program status monitoring method by means of an execution status monitoring means comprising: a means for regularly sending a status request message to and receiving a reply from the application program; a means for confirming that an application program is executing by receiving the reply from the application program and confirming the content of the received reply; and a means for determining a program error when there is no response from the application program to the execution status request message within a predetermined period, and then notifying the error recovery processor executing the predetermined error recovery process, and the error communication means for communicating when an error occurs.

A computer operation management system according to fifth aspect of the invention achieves the error recovery method executed when an application program error occurs by the program definition file recording the error responses method predefined by the user for execution when a program terminates abnormally, and a recovery process executing means for executing error recovery when an error occurs based on the error response method recorded to the program definition file.

A computer operation management system according to sixth aspect of the invention achieves the method for communicating errors occurring on the computer to the operator by: the program definition file recording the error communication method defined by the user; and an error communication means comprising: a means for collecting the log files of applications software under the management of the operation management system on all computers connected to the network; a means for processing and displaying data for the operator in an easy-to-understand format; and a means for automatically indicating an error by means of issuing an alarm, electronic mail, a console, printer, and/or a file.

A computer operation management system according to seventh aspect of the invention achieves the method for simultaneously executing plural programs under the operating system by: receiving new program startup requests in the execution status monitoring step after the execution control and process startup step is completed; and starting independently and parallel with previously executed programs that are subsequently started.

A computer operation management system according to eighth aspect of the invention achieves the method for controlling the execution priority of the application programs by: the program definition file recording the execution priority sequence of each program category as defined by the user; and an execution priority sequence controller comprising a means for dynamically controlling the priority sequence of both executing and queued programs based on the priority sequence read from the program definition file by resequencing the queued programs according to the priority sequence recorded in the queued program record file, dynamically changing the execution priority of executing programs and the execution priority of queued programs, and informing the operating system of the changed priority sequence.

A computer operation management system according to ninth aspect of the invention achieves the method for stopping an application program executing on a computer by: the program definition file recording the definition of a post-process defined by the user to be subsequently executed according to the ending status; and an ending processor comprising a means for recognizing program termination based on an ending message from the operating system, a means for identifying the ending status when a program terminates, a post-process executing means for executing the post-process according to the post-process definition, and a log file recording the end log when a program ends, said end log containing the program name, computer name, and time and date of program termination.

A computer operation management system according to tenth aspect of the invention achieves the method for managing the resources of the application program executing on the computer by: the program definition file recording for each executing application program the maximum primary storage device (memory) capacity, complementary storage device (disk drive) capacity, and cumulative processor time limit usable by each program; and a computer resources manager comprising a means for detecting when a program is executed exceeding the defined primary storage and complementary storage device capacity, or the cumulative processor time limit; and a means having a function for determining an error when the computer resources are used exceeding the defined limits, and notifying the error recovery processor and the error communication means.

A computer operation management system according to eleventh aspect of the invention achieves the method for managing the operation of applications software executed by means of communications between plural computers connected to a common network is achieved by: the program definition file recording information defined by the user for programs that execute by association and communication over a network; and a computer network manager comprising a means for communicating between the operation management systems installed on different computers on the network, a means for managing the operation of programs that execute by association and communication over a network according to the information for said programs defined in the program definition file, and a means for recognizing combinations of programs that execute by association and communication over a network.

A computer operation management system according to twelfth aspect of the invention executes the execution controller, execution status monitoring means, computer resources manager, and ending processor as a continuous process within the main program, and executes the execution priority sequence controller, error recovery processor, error communication means, and network manager on-demand as independent programs by the main program.

A computer operation management system according to thirteenth aspect of the invention executes the execution controller, execution status monitoring means, and ending processor as a continuous process within the main program, and executes the execution priority sequence controller, error recovery processor, error communication means, computer resources manager, and network manager on-demand as independent programs by the main program.

Operation:

A computer operation management system according to the invention limits the number application programs executing on an operating system enabling the simultaneous execution of plural application programs, and monitors application program execution, computer resources, and the network to enable stable, high reliability operation of individual application programs.

A computer operation management system according to the first aspect of the invention resides between the simultaneously executing application programs and the operating system, which is characterized by being able to simultaneously execute plural application programs, being able to generate from one executing program a new related program that can be communicated with or managed directly, handling all executing programs equally unless the operating system is otherwise specifically notified during program startup, and dynamically changing the priority sequence of executing programs, having a virtual storage area of finite size, and immediately abnormally ending program execution when the program to be executed exceeds the limits of the virtual storage area. The computer operation management system further has an interface to both the operating system and the individual application programs, and appears to the operating system to be a single application program. The program definition file is predefined by the user to record the maximum number of simultaneously executable programs, the execution priority of the program, the error recovery procedure, programs that execute by communication with other programs on the network, and information about the post-process to be executed after the program terminates for each program category. A queued program record file records the information of queued programs waiting to be executed; and a log file records log data when a program starts or ends, and when an error occurs.

A computer operation management system according to the second aspect of the invention manages and controls the execution status of application programs by executing on one operating system one operation management program for managing the operation of plural application programs in a manner enabling direct communication with or direct management of the application programs to be managed.

A computer operation management system according to, the third aspect of the invention records to the program definitions file during application program startup the maximum number of simultaneously executing programs for each program category or computer as defined by the user. During simultaneous execution of plural application programs, the execution controller limits for the operating system the number of executing programs by program category or computer based on the maximum number of simultaneously executable programs read from the program definition file (program definitions recording means). As a result, computer resources can be effectively utilized, and stable operation of the individual application programs is achieved. When a program cannot currently be simultaneously executed, the execution controller temporarily stores the data of that program to a queued program record file to enable the queued program to be executed after a predetermined period. After a program is started, the execution controller records the name of the started program, the time and date, and the computer name to a log file.

In a computer operation management system according to the fourth aspect of the invention, the execution status monitoring means regularly sends an execution status request message to and receives a reply from the application program, and confirms the content of the received reply to determine whether the application program is executing. When there is no response from the application program to the execution status request message, an error is determined to have occurred, and the error recovery processor executing the predetermined error recovery process, and the error communication means for communicating when an error occurs, are notified.

In a computer operation management system according to the fifth aspect of the invention, the program definition file records the error response method predefined by the user for execution when a program terminates abnormally, and a recovery process executing means executes error recovery when an error occurs based on the error response method read from the program definition file.

In a computer operation management system according to the sixth aspect of the invention, the program definition file records the error communication method defined by the user. The error communication means collects the log files of applications software under the management of the operation management system on all computers connected to the network. Based on the method read from the program definition file, data is processed and displayed in an easy-to-understand format for the operator, the operator is automatically notified by means of issuing an alarm, electronic mail, a console, printer, and/or a file.

In a computer operation management system according to the seventh aspect of the invention, new program startup requests are received in the execution status monitoring step after the execution control and process startup step is completed, and the last-executed programs are started independently and parallel with any programs previously executed to achieve simultaneous execution of plural application programs.

In a computer operation management system according to eighth aspect of the invention, the program definition file records the execution priority of each program category as defined by the user. Based on the priority sequence read from the program definition file, the execution priority sequence controller dynamically controls the priority sequence of both executing and queued programs by resequencing the queued programs according to the priority sequence recorded in the queued program record file, dynamically changing the execution priority of executing programs and the execution priority of queued programs, and notifying the operating system of the changed priority sequence.

In a computer operation management system according to the ninth aspect of the invention, the program definition file records the definition of the post-process defined by the user to be subsequently executed according to the ending status. The ending processor recognizes that a program has terminated based on an ending message from the operating system, identifies the ending status of the program, and executes the post-process according to the definition read from the program definition file. When a program terminates, an end log containing the program name, computer name, and time and date of program termination is recorded to the log file.

In a computer operation management system according to the tenth aspect of the invention, the program definition file records for each executing application program the maximum primary storage device (memory) capacity, complementary storage device (disk drive) capacity, and cumulative processor time limit usable by each program. The computer resources manager detects when a program is executed exceeding the limits defined in the program definition file, determines an error when the computer resources are used exceeding the defined limits, and notifies the error recovery processor and the error communication means when an error is determined.

In a computer operation management system according to the eleventh aspect of the invention, the program definition file records information for programs that execute by association and communication over a network. The computer network manager communicates between the operation management systems installed on different computers on the network, manages the operation of applications software using the network according to the information defined in the program definition file, and recognizes combinations of programs that execute by association and communication over a network.

In a computer operation management system according to the twelfth aspect of the invention, the execution controller, execution status monitoring means, computer resources manager, and ending processor are executed as a continuous process within the main program, and the execution priority sequence controller, error recovery processor, error communication means, and network manager are called on-demand and executed by the main program as independent programs.

In a computer operation management system according to the thirteenth aspect of the invention, the execution controller, execution status monitoring means, and ending processor are executed as a continuous process within the main program, and the execution priority sequence controller, error recovery processor, error communication means, computer resources manager, and network manager are called on-demand and executed by the main program as independent programs.

BRIEF DESCRIPTION OF THE DRAWINGS

The present invention will become more fully understood from the detailed description given below and the accompanying diagrams wherein:

FIG. 9 is a table of one example of the procedural definitions for error recovery processing in the computer operation management system according to the present invention;

DESCRIPTION OF PREFERRED EMBODIMENTS

The preferred embodiments of a computer operation management system according to the present invention are described hereinbelow with reference to the accompanying figures.

Figure 1:
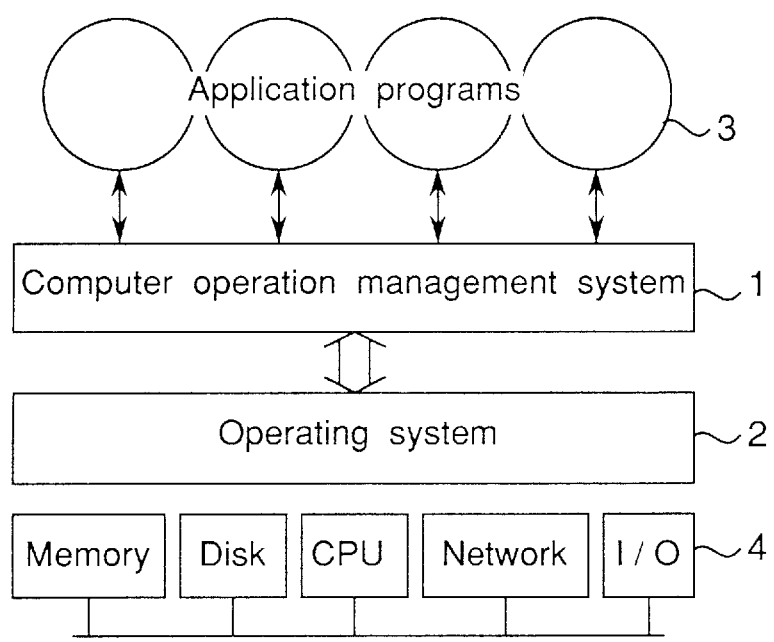
FIG. 1 is a conceptual diagram of the relationship between the operating system, application programs, and the computer operation management system of the present invention.

Embodiment 1:

FIG. 1 is a conceptual diagram of the software operation management system in a computer system according to the present invention. As shown in FIG. 1, The computer operation management system 1 of the present invention resides between the operating system 2 and the application programs 3, functioning as a single application program from the perspective of the operating system 2, but with an interface to the application programs 3 that makes the computer operation management system 1 appear to be part of the operating system 2 from the perspective of the application programs 3. The function of the computer operation management system 1 is to monitor and control execution of the application programs 3.

This operating system 2 has the following characteristics.

(1) The ability to execute plural application programs in parallel (2) The ability to generate a new program (child program) from one executing program (parent program); the number of simultaneously executing programs increases without being limited by the operating system.

(3) Simultaneously executing programs are executed and handled with the same priority unless otherwise specified. The priority of executing programs can be specified and dynamically changed.

(4) The virtual storage area has a finite size. When a program is executed exceeding this finite size, the program ends immediately and an abnormal end (error) is generated.

Figure 2:
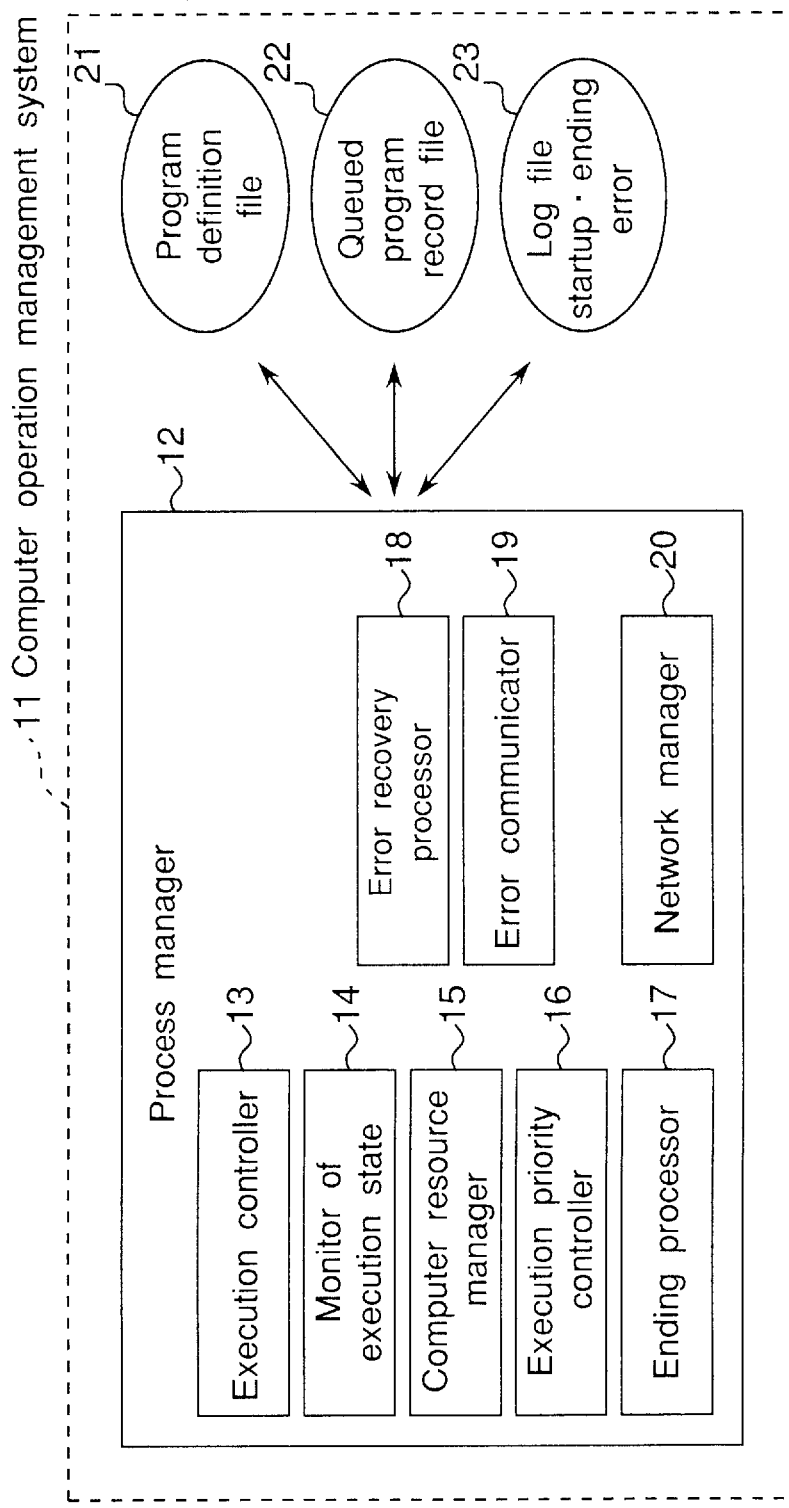
FIG. 2 is a block diagram of the computer operation management system according to the present invention.

The structure of the computer operation management system 1 shown in FIG. 1 is shown in FIG. 2 and described below.

As shown in FIG. 2, the computer operation management system 1 comprises a process manager 12, a program definition file 21, a queued program record file (request queue) 22, and a log file 23. The process manager 12 is a program operating under the operating system and residing in either the primary storage (memory) or complementary storage device (disk drive) of the computer to monitor and control the executing programs. The program definition file 21 resides on the complementary storage device (disk drive), and is the means for recording information about the executing programs, including the maximum number of simultaneously executable programs for each program category, the execution priority of each program, the procedures to execute when an error occurs, and the limits of the computer resources. The request queue file 22 also resides on the complementary storage device (disk drive), and is the means for recording information about programs for which the start of execution is restricted during program startup. The log file 23 also resides on the complementary storage device (disk drive), and is the means for recording the log of information relating to program startup, ending, and errors.

Referring to FIG. 2, the program definition file 21 includes the following data: the maximum number of simultaneously executable programs for each program category, the execution priority of each program, the procedures to execute when an error occurs during program execution, and the procedures to execute when a program ends normally. All of these data parameters are defined by the user. The program categories are more specifically groups of programs predefined by the user and indicating the type of program. The maximum number of simultaneously executable programs, priority sequence, error recovery procedures, and ending process are defined for each program category. The data recorded to the program definition file is referenced at program startup, program end, and when errors occur to execute the defined processes.

The queued program record file (request queue) 22 is a buffer area for holding programs waiting to be executed because of execution limits. Programs are stored to the queued program record file 22 in descending order of program execution priority for each program category. More specifically, there are plural request queues for each program category in the queued program record file 22, and the queued programs are recorded within each request queue in descending order from the program with the highest execution priority. As a result, programs are executed starting from the program of highest priority.

At program startup, the log file 23 records a startup log containing the name of the started program, the time and date the program was started, the computer name, and the program number at startup. When an error occurs, the log file 23 records an error log containing the program name, the time and date the error occurred, the computer name, the program number, and the error status. The error status is the termination message from the operating system or the conditions when the error occurred, and is provided by the process manager 12. When a program ends, the log file 23 records an end log containing the program name, the time and date the program ended, the computer name, the program number, and the ending status (normal or abnormal end). The recorded log files can be referenced by the user to determine the operating status of the system, for troubleshooting the cause of an error, or as otherwise required.

The process manager 12 shown in FIG. 2 also comprises the following controllers 13–20.

The execution controller 13 controls execution of the individual application programs according to the application program startup instructions received from either the operator or the program.

The execution status monitoring means 14 monitors the execution status of the application programs by exchanging messages with the executing application programs. When an error occurs in one of the executing programs, the execution status monitoring means 14 notifies the controller executing the predefined error process.

The computer resources manager 15 monitors the use of computer resources, including the CPU, memory, and disk drive, by comparing the limit values read from the program definition file 21 with the actual usage. When an error occurs, the computer resources manager 15 notifies the error recovery processor executing the predefined error recovery process, and the error communication means handling the predefined error notification process.

The execution priority sequence controller 16 controls the priority sequence of programs in the queued program record file (request queue) 22 and the priority sequence of executing programs, according to the program priority sequence read from the program definition file 21.

The ending processor 17 executes the post-process (the process executed after a program ends) when a program ends according to the post-process procedure stored in the program definition file 21, and records the end log to the log file 23.

The error recovery processor 18 executes the error recovery process when an error occurs according to the predefined error recovery process stored in the program definition file 21, and records the error log to the log file 23.

The error communication means 19 immediately informs the operator of an error after an error occurs by means of, for example, an audible alarm or other communications means according to the error recovery process stored in the program definition file 21.

The network manager 20 communicates with the process managers 12 executing on other computers on the communication network to exchange log information relating to program startup, errors, and ending. The process manager 12 of one computer can thereby determine the execution status of programs on other computers on the network, and centralized operations management can be achieved by means of a single computer.

Figure 3:
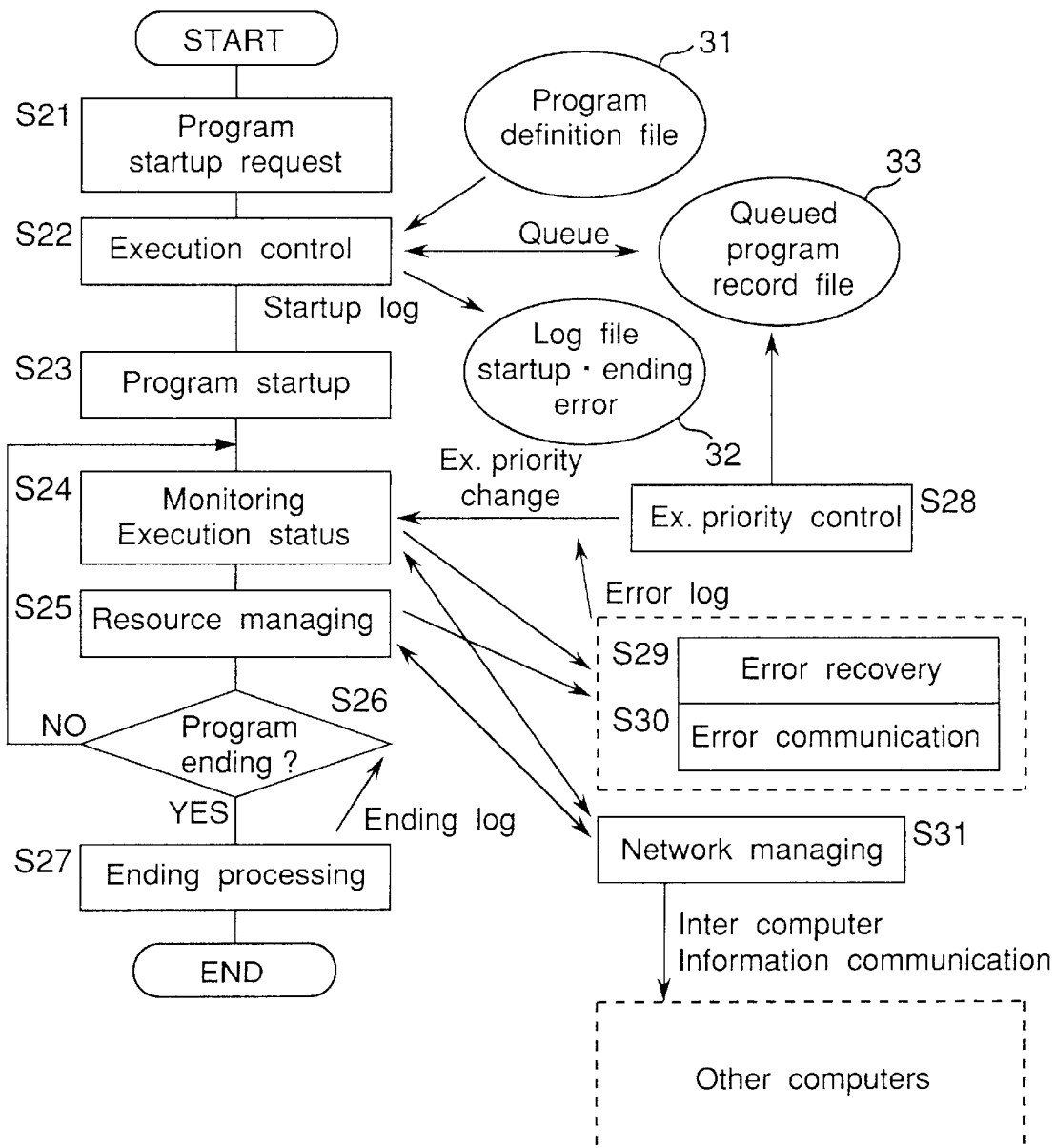
FIG. 3 is a block diagram and flow chart of the various controllers in one embodiment of a computer operation management system according to the present invention.

FIG. 3 is a block diagram and flow chart of the various controllers in one embodiment of the computer operation management system 1 according to the present invention.

When an application program is to be executed, an execution request goes to the computer operation management, system 1 and not the operating system. When a program startup request is issued by the operator or from another program to the computer operation management system 1 (S21), the execution controller 13 reads the maximum number of simultaneously executable programs from the program definition file 31 (S22), and compares this maximum number with the number of executing programs. If the number of executing programs is smaller than the read limit (maximum number), a child program startup request is issued to the operating system (S23). If the number of executing programs is equal to the limit (maximum number) and a program startup request is issued, the requested program is queued to the queued program record file 33.

The execution controller 13 regularly monitors the number of executing programs. As a result, when it becomes possible to execute a queued program, the next program to be executed is read from the queued program record file 33, and a startup request is issued to the operating system (S23). The execution controller 13 then records the startup log to the log file 32 when program startup ends.

The application programs 3 thus executed are executed maintaining a parent-child relationship with the process manager 12 so that information can always be exchanged (communicated) with the process manager 12 in the computer operation management system 1. When a new program is executed, the operating system 2 recognizes the program (i.e., the process manager 12 in the computer operation management system 1) executing the new program as the "parent," and the new program as the "child." The means for accomplishing this parent-child communication is characterized by being significantly simpler than the means required for communicating between programs in a different relationship. The application programs managed by the process manager 12 are always "children" relative to the process manager 12, and are structured and managed such that "child of child," i.e., "grandchild," programs will not occur.

Once a program is started, the execution status monitoring means 14 monitors the execution status of each executing program by sending messages to and receiving replies from each executing program (S24). When an error occurs with a monitored program, the error recovery processor 18 and error communication means 19 are appropriately notified to execute the predefined processes (S29 and S30).

When there is a request from the operator or another program during program execution to change the priority sequence of an executing program or a queued program in the queued program record file (request queue) 33, the execution priority sequence controller 16 changes the priority sequence of the executing programs or programs in the queued program record file 33 (S28).

Simultaneously to monitoring program execution by the execution status monitoring means 14, the computer resources manager 15 monitors the computer resources (S25) by comparing the actual usage of computer resources (including the CPU time, memory, and disk drive) with the resource usage limits defined in the program definition file. When an error occurs, the error recovery processor 18 and error communication means 19 are notified to execute the predefined processes (S29 and S30).

As part of the execution status monitoring and computer resource management routines, programs that execute while communicating with other programs on the network are also monitored by means of the network manager 20 exchanging information with the process managers of other computers 34 on the network (S31).

Execution status monitoring (S24) and computer resources management (S25) are then executed in a continuous loop until the operating system notifies the process manager that a program has ended.

When an error occurs during execution status monitoring or computer resources management, the error information is supplied to the error recovery processor 18, which executes the recovery process according to the recovery procedure defined in the program definition file, and simultaneously records the error log to the log file 32 (S29). The error communication means 19 also issues the appropriate alarm or other notification according to the error recovery process stored in the program definition file 21 (S30).

When the process manager is notified by the operating system that a program has ended, the ending processor 17 executes the ending process stored in the program definition file, and writes the end log to the log file (S27). The overall functionality of the various controllers of the computer operation management system 1 according to the present invention has been described above. A more detailed description of their operation follows.

Figure 4:
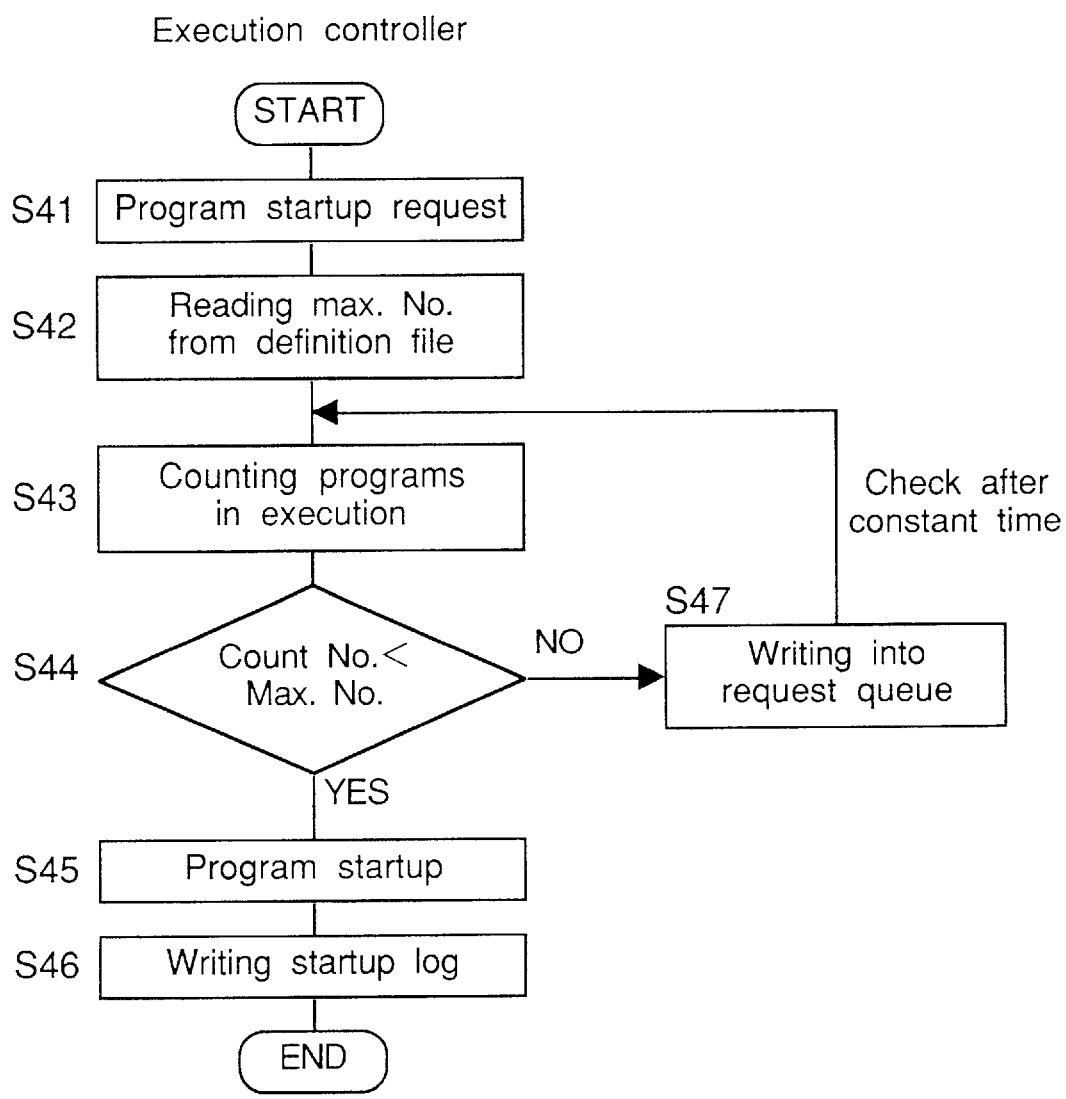
FIG. 4 is a flow chart of the operation of the execution controller in one embodiment of a computer operation management system according to the present invention.

FIG. 4 is a flow chart of the operation of the execution controller 13 of the process manager 12 in the computer operation management system 1 according to the present invention.

Program startup requests issued by the operator or from another program to the computer operation management system 1 (S41) are input to the process manager 12, which then reads the maximum number of said program copies that can be simultaneously executed from the program definition file 21 (S42). This maximum number of simultaneously executable programs may be (1) the total number of programs that can be simultaneously executed on that machine, or (2) the number of copies of a program category that can execute simultaneously. The number of programs of the same type that are currently running on that computer (machine) is also counted. The control limit read from the program definition file 21 is compared with the number of executing programs (S44). If the number of executing programs is smaller than the control limit, that program can be immediately executed and program startup continues (S45). The startup procedure instructs the operating system that the program is being started as a "child" (child process) of the process manager. When normal startup is completed, the name of the started program, time and date, computer name, and the program number at startup, are recorded to the log file 23 as the startup log (S46).

If during program execution the currently executing number of programs is smaller than the control limit, that program is stored to the queued program record file (request queue) 22, the buffer area for programs waiting to execute, as immediately executable.

The process manager 12 regularly checks whether queued programs in the queued program record file (request queue) 22 for which an execution request has been issued can be executed. This execution query process continues to determine whether the queued programs can be executed insofar as the number of currently executing programs exceeds the control limit. When the number of currently executing programs becomes less than the control limit, the operating system is instructed to proceed with program execution (S45).

Figure 5:
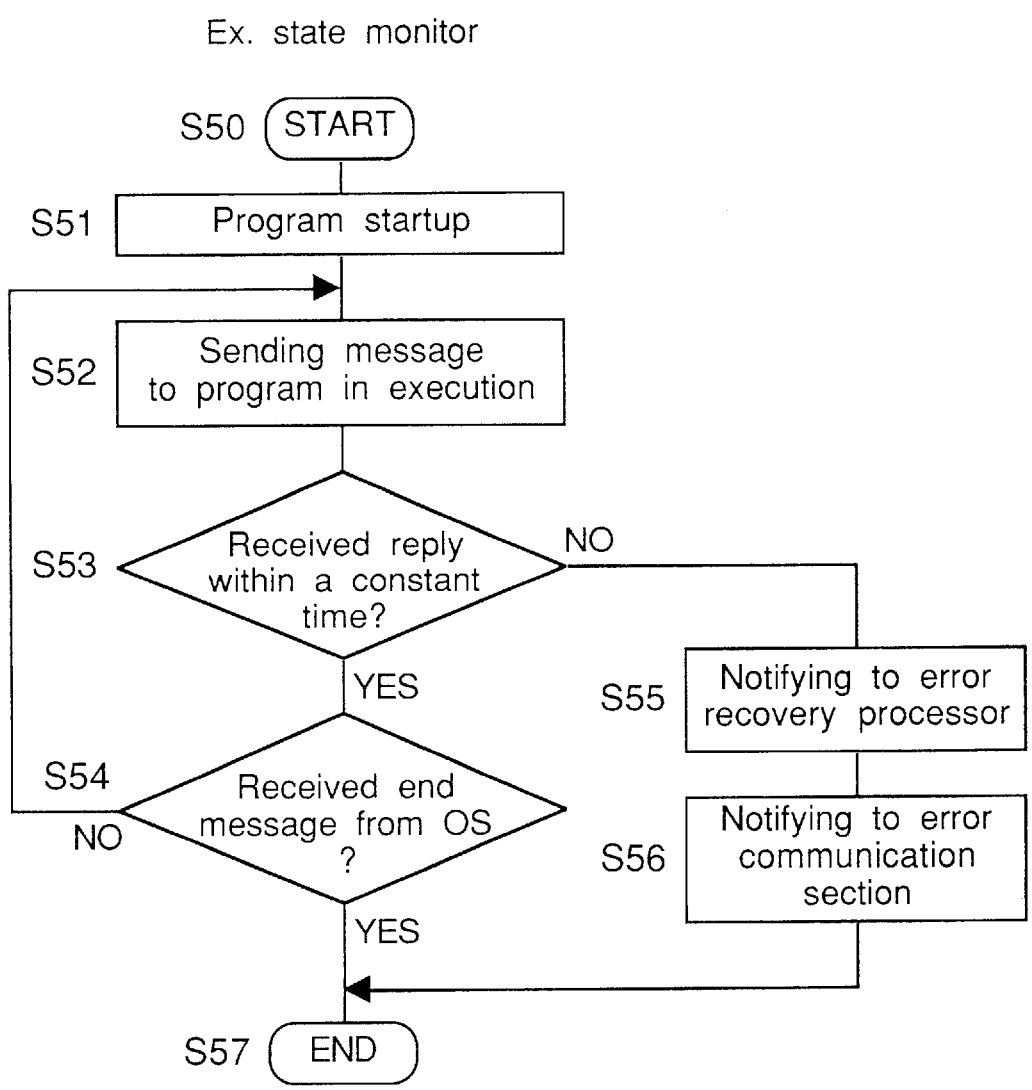
FIG. 5 is a flow chart of the operation of the execution status monitoring means in one embodiment of a computer operation management system according to the present invention.

FIG. 5 is a flow chart of the operation of the execution status monitoring means 14 in one embodiment of the computer operation management system according to the present invention.

Referring to FIG. 5, the process manager 12 starts an application program as a "child" of the process manager 12 based on the program startup request (S51). The operating system tracks the program (process) managing the startup of a program as the "parent process," and the program that is thus started as the "child process." The means for communicating between programs in a parent-child relationship is simple.

All application programs are executed as "children" of the process manager 12. By regularly communicating with the executing programs, the process manager 12 is able to centrally manage the execution status of each application program.

Referring again to FIG. 5, the execution status monitoring means 14 sends a message to each application program under its management at a regular interval to determine whether each polled program is still executing (S52).

The polled application program immediately sends to the execution status monitoring means 14 a response message identifying which confirmation message the application program is responding to. The process manager 12 confirms that the polled application program is still executing by receiving the response within a predetermined period of time (S53). The process manager 12 monitors the execution status of each program by repeating this message exchange with each application program until the operating system notifies the process manager 12 that a particular application program has ended (S54).

All application programs are written to respond immediately when a confirmation message is received from the process manager 12. This function can be achieved by providing the required subroutines as a library for inclusion when writing and compiling the program.

If the response is not received within the predetermined period of time (S53), the process manager 12 determines that an error has occurred in the application program, and so notifies the error recovery processor 18 and error communication means 19 (S55, S56). The error recovery processor 18 and error communication means 19 then execute the appropriate predefined procedures.

It is thereby possible for the computer operation management system to detect errors when an error occurs in an executing program, and can implement the appropriate error recovery or escape process. Errors produced by a program can often not be detected by either the program itself or the operating system, thus making a computer operation management system as described by the present invention essential for operation of systems requiring high reliability.

A method for simultaneously executing plural programs by means of the execution controller 13 and the execution status monitoring means 14 of the computer operation management system according to the present invention is described next.

When a new program startup request is issued either by the operator or a program, the process manager 12 starts the program as a child process as described above. After program startup, the execution status monitoring means 14 monitors the execution status of the program. From this state it is possible for the process manager 12 to receive another new program startup request. When another program startup request is thus received, the new program is started up by the execution controller 13, and the execution status is then monitored by the execution status monitoring means 14. At this point the process manager 12 is monitoring the execution of two programs, and can receive another new program startup request. This simple loop is thereafter repeated, thus making it possible to increase the number of simultaneously executing programs.

Figure 6:
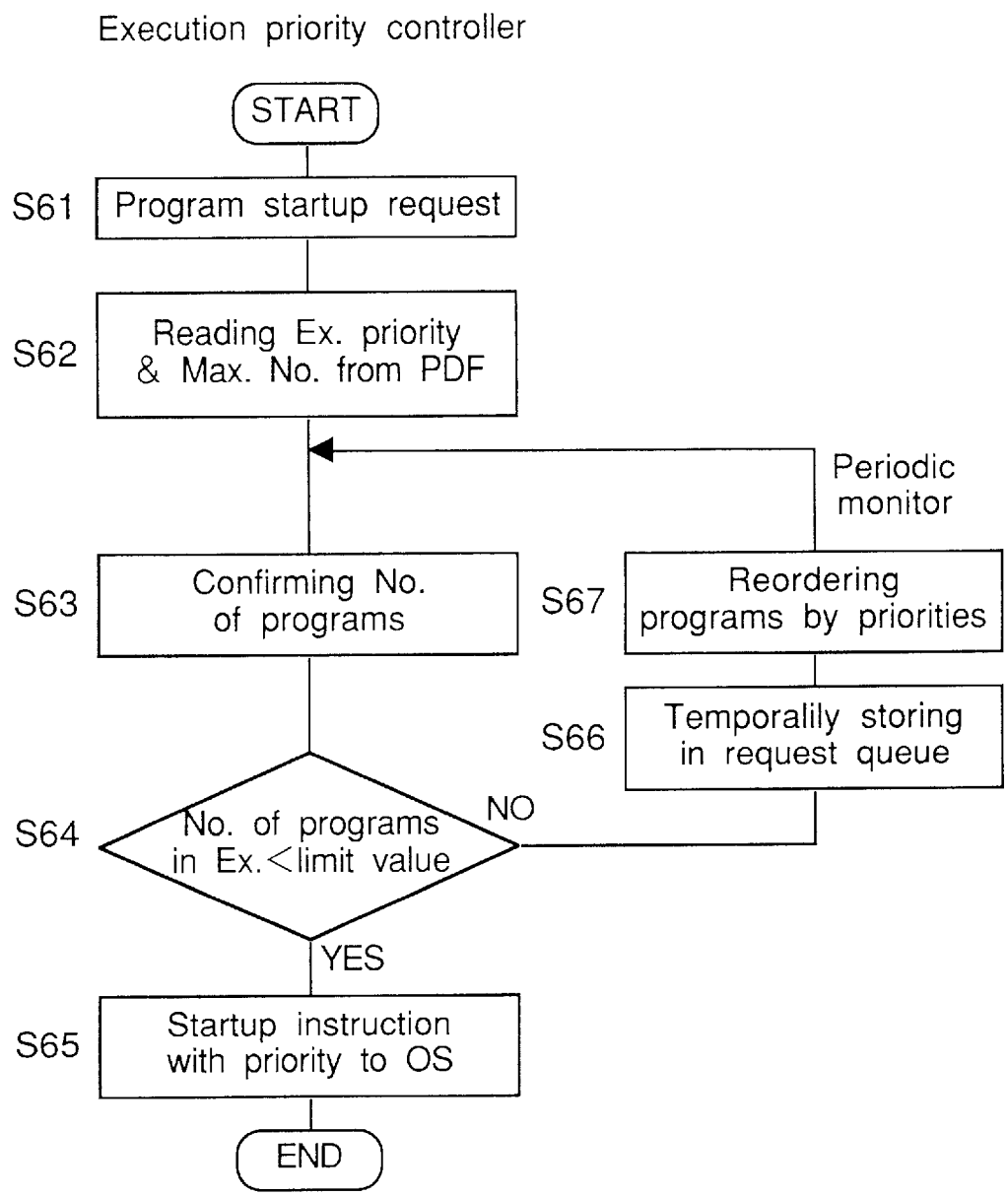
FIG. 6 is a flow chart of the operation of the execution priority sequence controller when program startup is requested in the computer operation management system according to the present invention.

FIG. 6 is a flow chart of the operation of the execution priority sequence controller 16 when program startup is requested in the computer operation management system according to the present invention.

Referring to FIG. 6, when a program startup request is input to the process manager 12 (S61), the execution priority sequence controller 16 reads the priority sequence of the program and the maximum number of simultaneously executable programs managed by program group from the program definition file 21 (S62). The execution priority sequence controller 16 then confirms the number of currently executing programs and the number of programs of the same program category (S63).

If the number of currently executing programs is less than the number of executable programs read from the program definition file, the program is started as a child program of the process manager by informing the operating system of the priority sequence of the program and instructing the operating system to start that program. If it is attempted to start a program exceeding the control limit of the number of simultaneously executable programs, execution is immediately disabled, the defined priority sequence (initialization value) is attached to the program, and the program is temporarily stored to the queued program record file (request queue) 22 as an execution request (S66). The priority sequence of the queued program is compared with those of other programs in the request queue 22, and the request queue 22 is sorted in descending order of priority (S67).

The process manager 12 regularly monitors the number of executing programs so that when execution of one of the programs in the request queue 22 becomes possible, the program at the top of the queue is moved to memory and executed by the execution controller.

Figure 7:
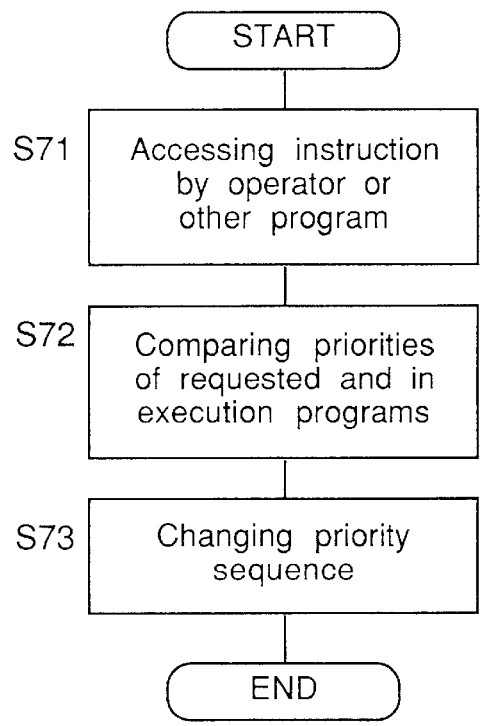
FIG. 7 is a flow chart of the operation of the execution priority sequence controller when the priority sequence of executing programs is dynamically changed in the computer operation management system according to the present invention.

FIG. 7 is a flow chart of the operation of the execution priority sequence controller 16 when the priority sequence of executing programs is dynamically changed based on operator instructions input from a console or instructions from another program.

The execution priority sequence controller 16 is always aware of what programs are currently executing and the priority sequence of those programs. When there is a request based on operator instructions input from a console or instructions from another program to change the priority sequence of an executing program (S71), the execution priority sequence controller 16 is able to determine the appropriate priority sequence based on the new priority sequence change request received from an external source, and the relationship between the various executing programs (S72).

This evaluation compares the priority sequence of the requested program (specifically the program for which the priority sequence change was requested) with the priority sequence of the currently executing programs to determine the relative priority of the concerned programs and set the amount of change that can be made in the execution priority. Therefore when another program is being processed with higher priority and the priority of the requested program is to be raised, the priority is increased significantly to enable priority execution over the other programs. A change in the priority sequence of programs executing in memory is achieved by changing the time that program can use the CPU (CPU time).

The priority sequence is thus changed based on this evaluation (S73). After the priority sequence is changed, the new priority sequence becomes immediately valid, and all programs are executed based on this new priority sequence. This process can be achieved by informing the operating system of the program name and the changed (updated) priority sequence.

The execution priority sequence controller 16 is also able to dynamically change the priority sequence of queued programs based on operator instructions input from a console or instructions from another program. When there is a request to change the priority sequence of queued programs based on operator instructions input from a console or instructions from another program, the priority sequence of the requested program is compared with those of the other queued programs to effect a priority sequence change as described above. After the priority sequence is changed, the queued programs are resorted in order of descending priority.

Figure 8:
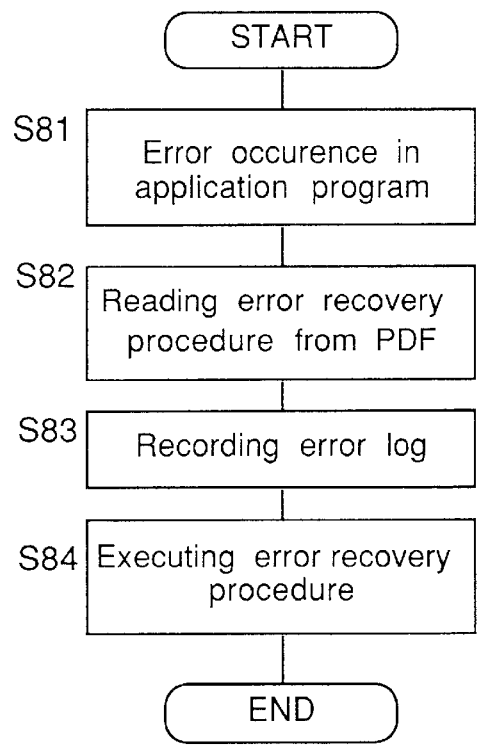
FIG. 8 is a flow chart of the operation of the error recovery processor in the computer operation management system according to the present invention.

FIG. 8 is a flow chart of the operation of the error recovery processor 18 in the computer operation management system according to the present invention.

Referring to FIG. 8, the error recovery processor 18 is activated when it is informed by the execution status monitoring means 14 that an application program is in an error state (S81). The error recovery processor 18 then reads the error recovery procedure from the program definition file (S82).

The error recovery procedure is defined separately for each application program category, and comprises what measures to implement when an error occurs, the recovery procedure, alarm notification, mail, and what measures to implement for any related programs. The same error recovery procedure is used for all programs in a single program category, although it is also possible to define a unique error recovery procedure for each program. This data can be appropriately rewritten as required by the system administrator, and the new error recovery procedures can be executed as the valid recovery procedure from the time the procedure is rewritten.

The error recovery processor 18 faithfully execute the error recovery procedure (S84) as defined. This error recovery procedure is also executed with precedence over all other executing programs, and a record of recovery procedure execution is stored as the error log containing the computer name, program name, action taken, and time in the log file 23 (S83).

FIG. 9 is a table of one example of the procedural definitions for error recovery processing in the computer operation management system according to the present invention. In FIG. 9 the program category describes the program name. Plural copies of the same program can be executed simultaneously, but the error recovery procedure is the same for all executing copies of that program.

The measure implemented when an error occurs (column 2 of the table) describes what measure to take when an error occurs in one of executing application programs; the measures shown include do nothing, forced end, and an error recovery procedure. The procedures for a forced end and the error recovery procedures are defined in the program definition file 21.

Alarm notification (column 4) defines whether the operator is to be automatically notified when an error occurs by means of paging via a pocket pager, paging via the public address system, or other means. Mail (column 5) refers to electronic mail, and defines whether an alarm (error message) is to be displayed on the computer terminal when an error occurs, or whether an e-mail message is to be sent to another computer terminal on the network. The communications functions applied when an error occurs is achieved by means of the error communication function described below.

Related programs (column 6) define the program group executed simultaneously to and having a relationship with the program generating the error, or defines the program group to be executed upon termination of the program generating the error. The error recovery procedure is defined in the program definition file 21 for all programs belonging to the same program group, and all executing programs in that group are processed according to the same error recovery procedure.

Figure 10:
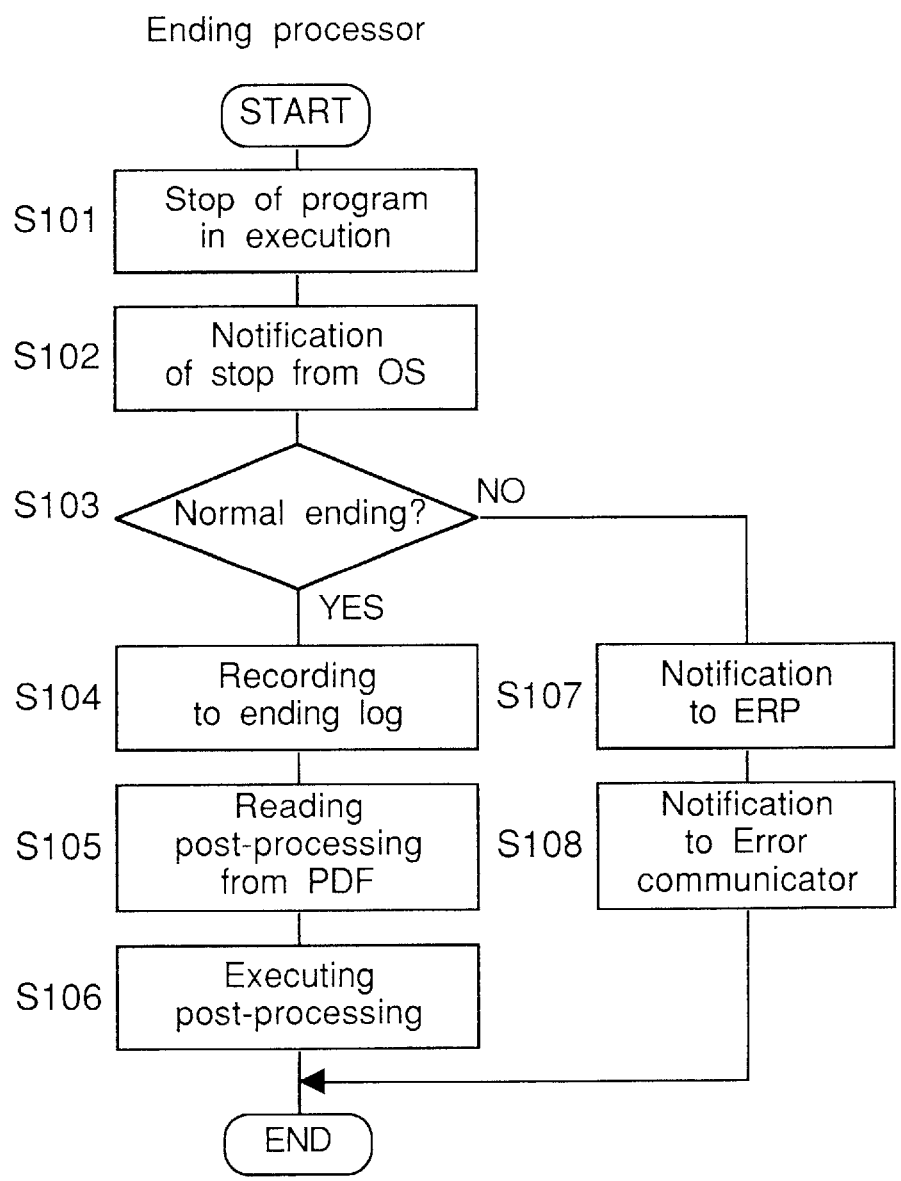
FIG. 10 is a flow chart of the operation of the ending processor in the computer operation management system according to the present invention.

FIG. 10 is a flow chart of the operation of the ending processor 17 in the computer operation management system according to the present invention.

When an executing program stops (S101), the operating system notifies the ending processor 17 of the process manager that program ended (S102). Based on the ending status of the program received from the operating system, the ending processor 17 determines whether the end was normal or abnormal (S103). If the program terminated due to an abnormal end, the error recovery processor 18 is notified (S107), and the corresponding recovery process is requested. When program termination was normal, the ending processor 17 records the ended program name, machine name, time and date, program number, and ending status to the end log of the log file 23 (S104). Any procedure defined for execution upon program termination is then read from the program definition file 21 (S105), and that procedure is faithfully executed (S106). Continuous processing of a program can thus be achieved using this post-process definition. When the post-process is completed, the complete sequence of processes is completed.

Figure 11:
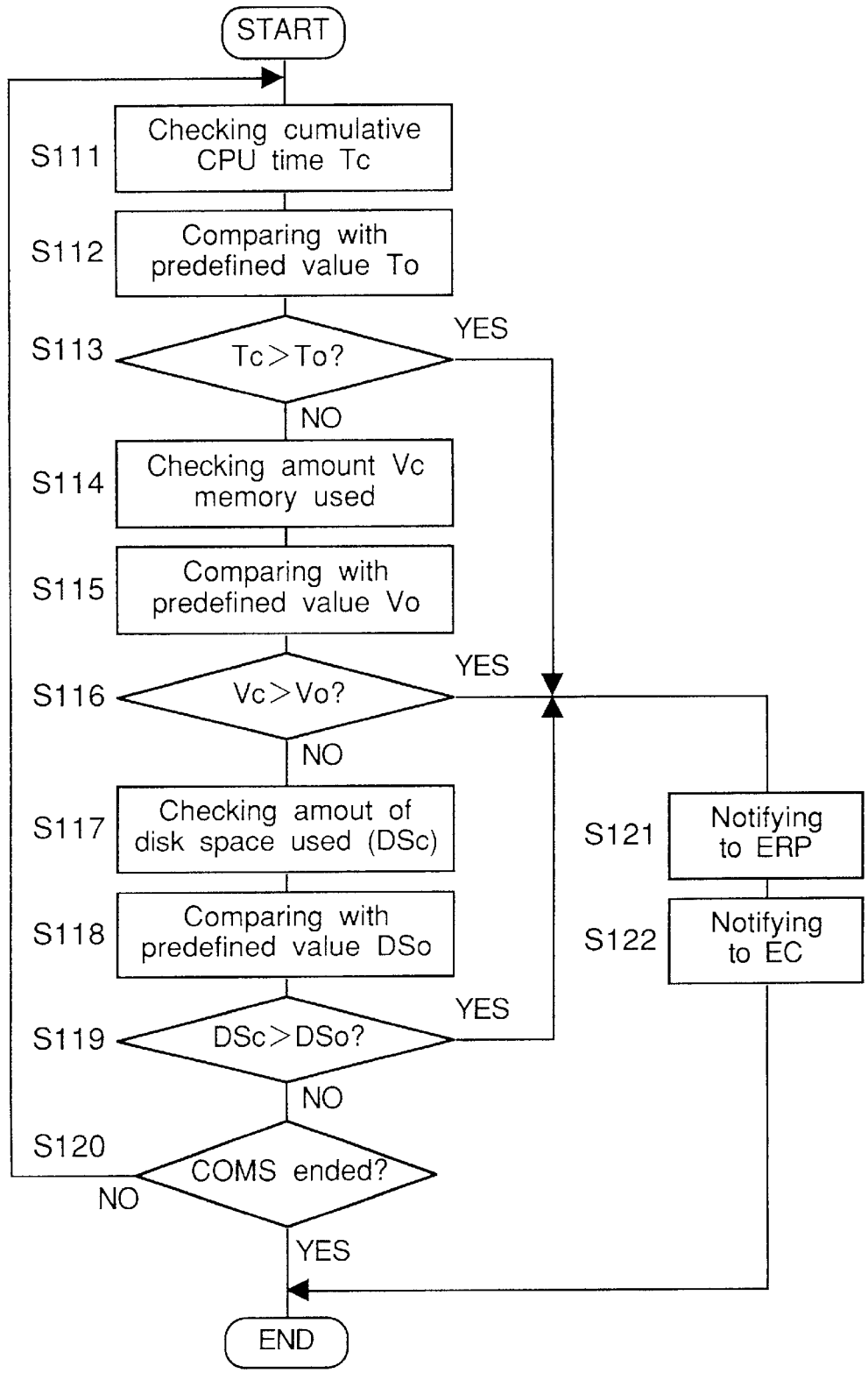
FIG. 11 is a flow chart of the operation of the computer resources manager in the computer operation management system according the present invention.

FIG. 11 is a flow chart of the operation of the computer resource manager 15 in the computer operation management system according to the present invention.

Referring to FIG. 11, the computer resource manager 15 checks the cumulative CPU time used by each program for all executing programs managed by the process manager 12 (S111), and then compares the actual CPU time total with the control limits (predefined value) read from the program definition file (S112). If this comparison shows the control limit to be exceeded, the error recovery processor 18 and error communication means 19 are notified (S121, S122).

If the cumulative CPU time does not exceed the control limit, the computer resource manager 15 checks the amount of memory used (S114), and then compares the actual memory used with the control limit (predefined value) read from the program definition file (S115). If this comparison shows the control limit to be exceeded, the error recovery processor 18 and error communication means 19 are notified. (S121, S122).

The amount of disk space used is similarly checked (S117), and the actual disk space used is compared with the control limits (predefined values) read from the program definition file (S118). If this comparison shows the control limit to be exceeded, the error recovery processor 18 and error communication means 19 are notified (S121, S122).

The resource control limits are defined in the program definition file 21 by the user as the maximum amount of any given resource that can be used by each program category. In this example, the cumulative CPU time, memory allocation, and disk space allocation are specifically defined. The actions to be taken when the defined resource limits are exceeded are also defined by the user for each program (or program category) in the program definition file 21.

The network manager 20 of the computer operation management system according to the present invention is described next below.

The object of the network manager 20 is to manage the operation of a large-scale application program operating on plural computers by communication between the individual, copies of the application (a network application) by enabling the process managers 12 to communicate with each other and share information between plural networked computers connected to a common network and used to individually execute an application that communicates with other copies of that application running on other computers.

The information exchanged between the process managers 12 on different computers is log file information relating to the program start, end, and errors; operating status data for application programs operating by communicating between computers; and information related to the program definition file (including priority sequence and error recovery procedures). The log file also records the name of the computer from which the information originated, making it possible to determine from which computer the log file originated, and enabling the information to be monitored by a single computer. The operating status of application programs that operate while communicating with programs executing on other networked computers is managed by the process managers executing on the individual computers. The individual process managers then communicate with each other regularly so that the network application can execute without conflict. The program priority sequence, error recovery procedure, and other information in the program definition file is centrally managed by copying information input on one computer to plural computers as may be necessary.

Figure 12:
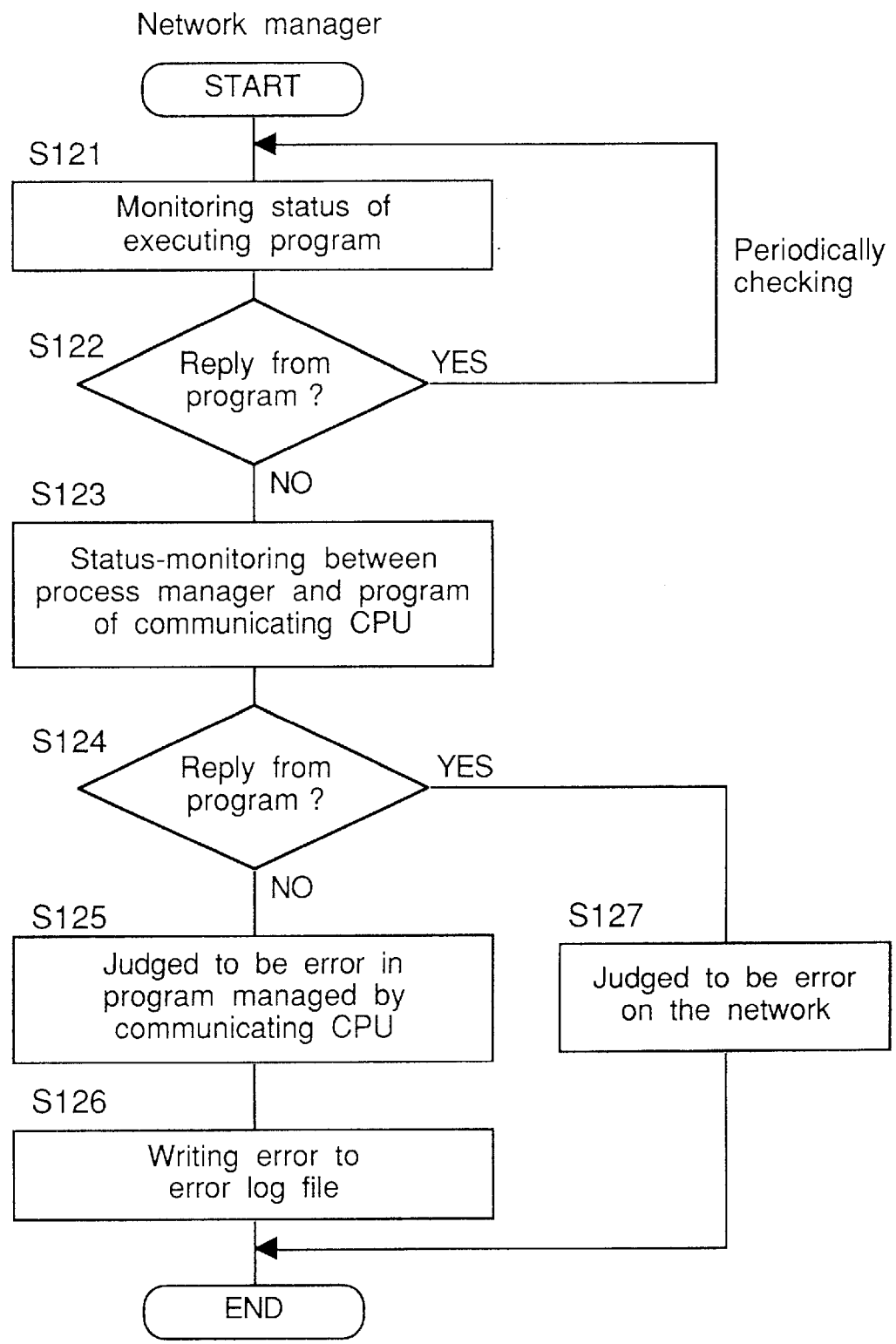
FIG. 12 is a flow chart of the operation of the network manager in the computer operation management system according to the prevent invention.

FIG. 12 is a flow chart of the operation of the network manager 20 in the computer operation management system according to the present invention.

Referring to FIG. 12, the process manager 12 sends a status request message to the application program executing on one computer to monitor the status of that program (S121). If the process manager 12 receives the response from that application program within the predefined time period (S122), the process manager 12 continues to monitor the program status by repeating this messaging loop as described above.

If the process manager 12 does not receive the response from that application program within the predefined time period (S122), the process manager 12 checks the execution status of the queried program. The process manager 12 recognizes the communicating computer and program based on the definition of the related programs in the program definition file 21. Messages are exchanged between the process managers of the communicating computers for status monitoring (S123). If the process manager normally receives the response from the program (S124), the process manager determines that an error has occurred on the network (S127). If the process manager does not receive the response from the program, the process manager determines that an error has occurred in one of the managed programs (S125), and writes an error log to the log file 23 (S126).

Figure 13:
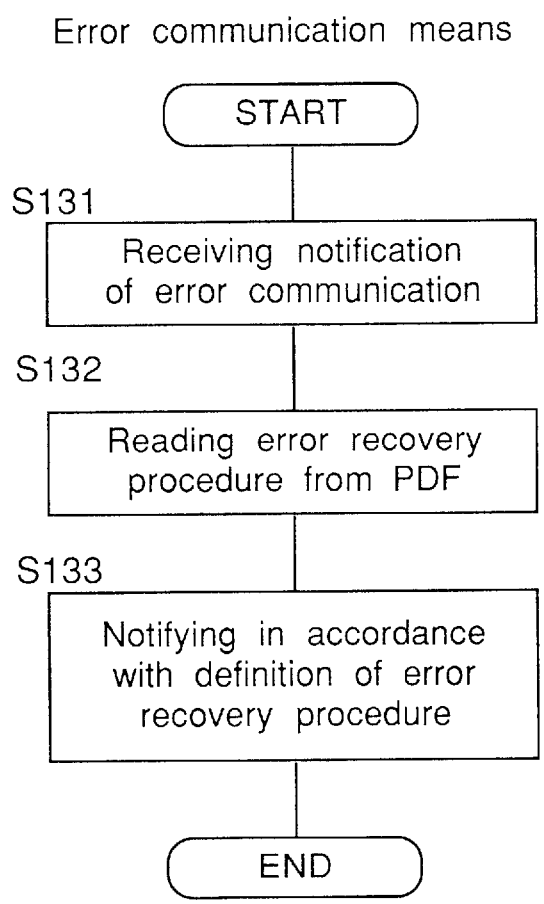
FIG. 13 is a flow chart of the operation of the error communication means achieving the error communication function of the computer operation management system according to the present invention.
Figure 14:
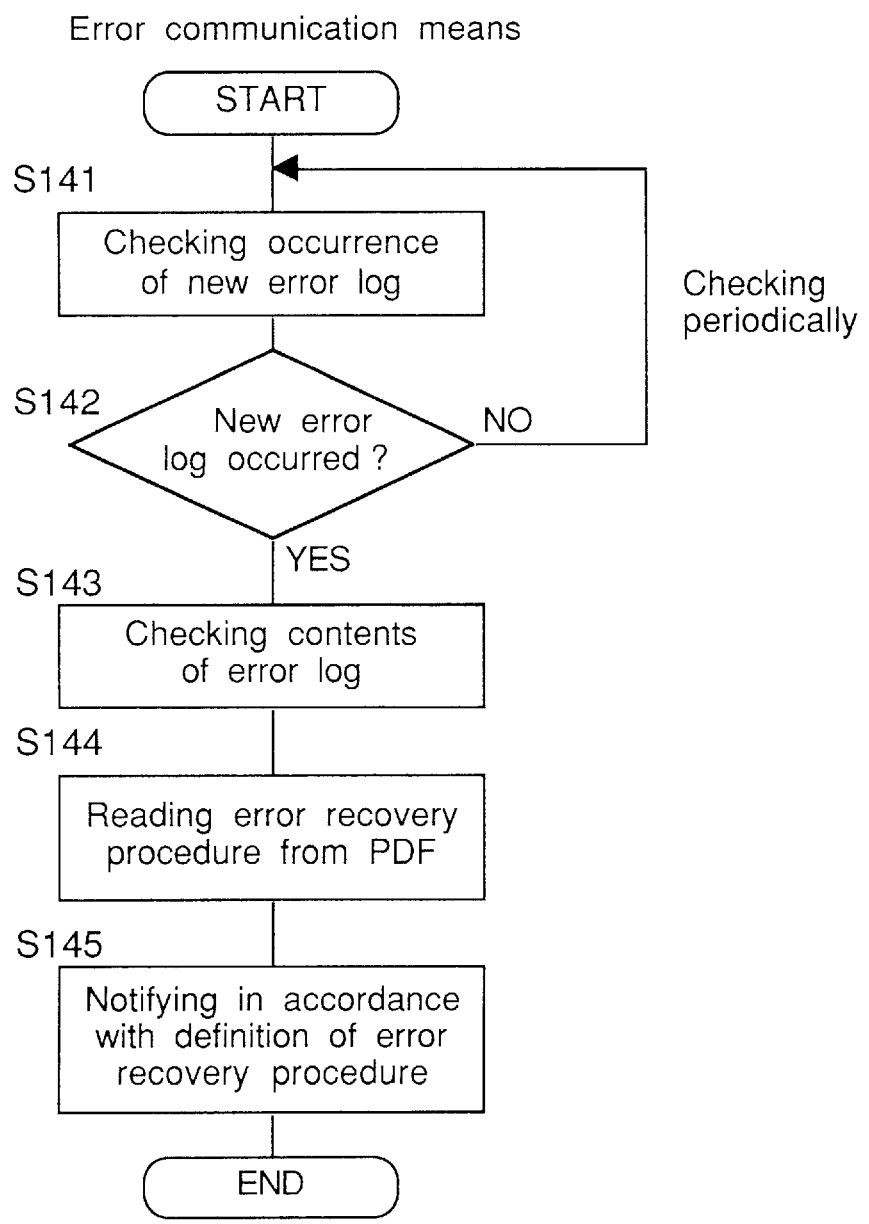
FIG. 14 is a flow chart of the operation of the error communication means achieving the error communication function and the error monitoring function of the computer operation management system according to the present invention.

FIGS. 13 and 14 are flow charts of the operation of the error communication means 19. The error communication means 19 has two functions: (1) an error communication function notifying the operator that an error has occurred in accordance with the procedure defined for execution when an error occurs, and (2) an error monitoring function for detecting the occurrence of errors on another computer on the network.

The flow chart in FIG. 13 describes the error communication function. When the error communication means 19 is notified of an error by the execution status monitoring means 14 or computer resources manager 15 (S131), the error recovery procedure is read from the program definition file 21 (S132). To notify the operator of the error, the message contents are output to a general purpose alarm, electronic mail, central monitoring station, or other means as defined by the error recovery procedure (S133).

A general purpose alarm is essentially an intercom or public address system whereby an announcement is made using electronic sounds. Electronic mail refers to electronic mail messages indicating that an error has occurred; these messages are output to the computer terminal of the operator, system administrator, or other defined destination. The central monitoring station is simply a central computer system console or display where messages are displayed. It is also possible to simultaneously output the same message to a disk file or hard-copy printer output.

The flow chart in FIG. 14 describes the operation executed by the error communication function after error detection by the error monitoring function of the error communication means 19. The error monitoring function regularly monitors the content of the log files 23 of the networked computers to check whether a new error log has been generated (S141). If a new error log is not detected (S142), the error monitoring function continues to regularly check for any new error logs (S141). If a new error log is detected (S142), the log content is checked (S143). When an error log is confirmed by the error monitoring function, the error recovery procedure is read from the program definition file 21 by the error communication function (S144), and an alarm is issued according to the predefined procedure in the program definition file 21 (S145).

The error communication means 19 thus centrally manages the log files of the networked computers via the process managers 12 of the networked computers, and comprises a function for communicating the errors and a function for centrally monitoring whether any errors have occurred on the network. The error communication function is triggered by detection of a new error log on any networked computer. The error monitoring function monitors defined types of error logs generated on any computers within a specific range predefined in the program definition file.

Figure 15:
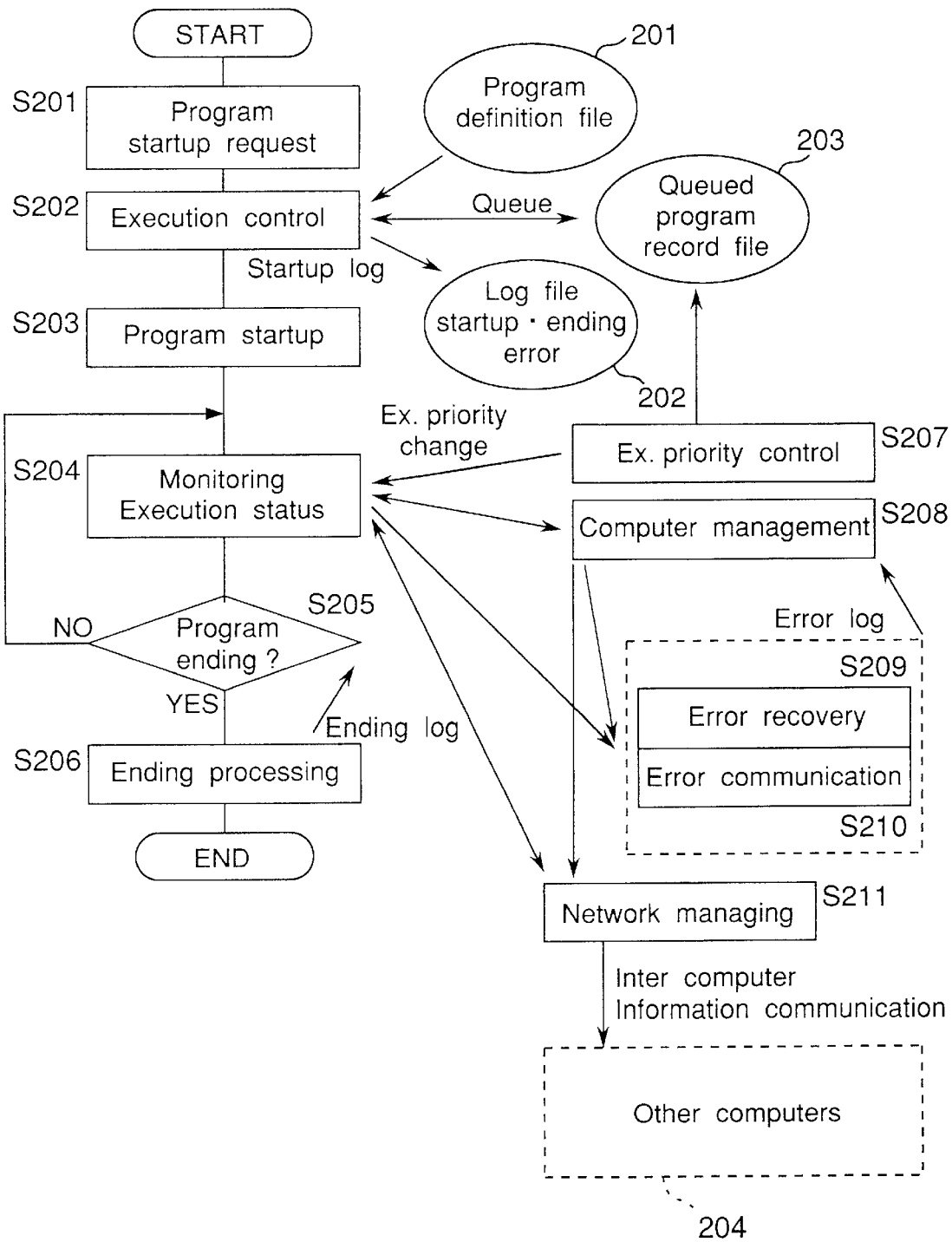
FIG. 15 is a flow chart and block diagram of the various controllers in a second embodiment of a computer operation management system according to the present invention.

Embodiment 2:

FIG. 15 is a flow chart and block diagram of the various controllers in a second embodiment of a computer operation management system according to the present invention.

Referring to FIG. 3, the first embodiment of the invention comprises the computer resources management function as part of the main program loop. In the second embodiment shown in FIG. 15, however, the computer resources manager functions as an independent program called and executed on-demand as required by the main program.

The various controllers shown in FIG. 15 function identically to those described in the first embodiment above.

Referring to FIG. 15, when an application program 3 is to be executed, the execution request goes to the computer operation management system 1 and not the operating system 2 in a computer operation management system 1 according to the present invention. When a program startup request is issued by the operator or from another program to the computer operation management system 1 (S201), the execution controller 13 reads the maximum number of simultaneously executable programs from the program definition file 201 (S202), and compares this maximum number with the number of executing programs. If the number of executing programs is smaller than the read limit (maximum number), a child program startup request is issued to the operating system (S203). If the number of executing programs is equal to the limit (maximum number) and a program startup request is issued, the requested program is queued to the queued program record file 203. The execution controller 13 regularly monitors the number of executing programs. As a result, when it becomes possible to execute a queued program, the next program to execute is read from the queued program record file 203, and a startup request is issued to the operating system (S203). The execution controller 13 then records the startup log to the log file 202 when program startup ends.

Once a program is started, the execution status monitoring means 14 monitors the execution status of each executing program by sending messages to and receiving replies from each executing program (S204). When an error occurs with a monitored program, the error recovery processor 18 and error communication means 19 are appropriately notified to execute the predefined processes (S209 and S210).

When there is a request from the operator or another program during program execution to change the priority sequence of an executing program or a queued program in the queued program record file (request queue) 203, the execution priority sequence controller 16 changes the priority sequence of the executing programs or programs in the queued program record file 203 (S207).

As necessary, the execution status monitoring means 14 calls the computer resource manager 15, and the computer resource manager 15 monitors the computer resources (S208) by comparing the actual usage of computer resources (including the CPU time, memory, and disk drive) with the resource usage limits defined in the program definition file 21. When an error occurs, the error recovery processor 18 and error communication means 19 are notified to execute the predefined processes (S209 and S210).

Execution status monitoring (S204) is then executed in a continuous loop until the operating system 2 notifies the process manager 12 that a program has ended. The network manager 20 also monitors programs that execute while communicating with other programs on the network are by means of the exchanging information with the process managers 12 of other computers 204 on the network (S211).

When an error occurs during execution status monitoring or computer resources management, the error information is supplied to the error recovery processor 18, which executes the recovery process according the recovery procedure defined in the program definition file, and simultaneously records the error log to the log file 202 (S209). The error communication means 19 also issues the appropriate alarm or other notification according to the error recovery process stored in the program definition file (S210).

When the process manager 12 is notified by the operating system that a program has ended, the ending processor 17 executes the ending process stored in the program definition file 21, and writes the end log to the log file 202 (S206).

Effects of the invention:

The computer operation management system of the present invention achieves the following effects by effectively utilizing the primary storage (memory), complementary storage (disk drive), and CPU of a stand-alone computer or networked computers by limiting and monitoring for the operating system the number of simultaneously executable programs.

(1) By limiting for the operating system the number of simultaneously executable programs, and managing program execution so that memory or disk space shortages do not occur, excessive deterioration of processing speed resulting from memory shortages can be prevented and performance can therefore be improved when plural programs are simultaneously executed on a stand-alone computer or networked computers.

(2) Forced abnormal ending of some programs and loss of some system functionality resulting from a temporary insufficiency of memory or disk space can be prevented when plural programs are simultaneously executed, and a high reliability system free of abnormally ending programs can be achieved.

(3) When an error occurs in an executing application program and the program ends abnormally, the program causing the problem and the timing of the error can be tracked by referencing a centrally managed error log. Errors occurring in systems where programs are used over a network or plural programs work together cooperatively can also be tracked.

(4) It is also possible to detect errors occurring with incomplete programs that do not issue an error message even though an error has occurred during program execution.

(5) Program execution priority can be defined, thereby enabling real-time processing when required by any given program. It is also possible to weight programs according to their importance so that important programs are processed with priority.

(6) The recovery procedure to be executed when a program ends abnormally can be defined and automatically executed, thereby greatly facilitating troubleshooting by the operator.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer system comprising:
   a computer having a central processing unit, a main memory and an auxiliary memory;
   a UNIX operating system for operating said computer, said operating system enabling said computer to execute plural application programs simultaneously; and
   a process manager intervening between said UNIX operating system and said plural application programs, said process manager comprising;
   an execution status monitor for monitoring an execution status of plural application programs to limit the number of application programs simultaneously executed;
   a computer resource manager for monitoring use status of at least one computer resource;
   an error recover processor for executing an error recover process when an error is detected by said computer resource manager; and
   an ending processor for executing an error recover process when an error is detected by said computer resource manager; and
   and ending processor for executing a post-process when said monitor detects one of plural application programs in execution has ended.

2. The computer system according to claim 1 in which said process manager further comprises a management program acting as an application program to said operating system and a program definition file storing information regarding the maximum number of simultaneously executable application programs for each program category and said management program monitors the number of application programs being executed upon starting a new application program and, if the number of application programs being executed is equal to the maximum number stored in said program definition file, startup of a new application program is prohibited.

3. The computer system according to claim 2 wherein the execution status of application programs is managed and controlled by executing said management program in a manner enabling direct communication with or direct management of the application programs to be managed.

4. The computer system according to claim 1 further comprising a priority controller for controlling the execution priority of each application program for each category of program, said execution priority of each application program including information related to the order of execution and a time rate allocated in execution of each application program.

5. The computer system according to claim 4 in which said priority controller has a queued program record file for temporarily storing data of application programs which are queued for execution and determines an order of execution for queued programs based on said execution priority of each application program.

6. The computer system according to claim 1 in which said execution status monitor sends a message to each application program periodically and determines from contents of a message sent back from each application program if said application program is in execution.

7. The computer system according to claim 6 in which said error recover processor executes a predefined error recover process which executes a predefined error recovery procedure for an application program when no message is sent back from the application program.

8. The computer system according to claim 6 in which said ending processor executes post execution processing when a message indicative of an end of an application program and a state of the end is issued from said application program, said post processing being predefined in accordance with said state of the end.

9. The computer system according to claim 1 further comprising an error detector for detecting an error when an application program is executed exceeding one of limits predefined with respect to main and auxiliary memory and cumulative processing time allocated to said application program and an error recovery processor for executing a predefined error recovery procedure.

10. The computer system according to claim 1 further comprising an error notification process for notifying a user when an error is detected.

11. A computer system comprising:

a plurality of computers connected by a network;

each computer having a UNIX operating system for operating said computer, said operating system enabling said computer to execute plural application programs simultaneously, and a process manager intervening between said operating system and said plural application programs for monitoring executing status of plural application programs to limit the number of application programs executed simultaneously, a communication interface for communicating between process managers of an arbitrary two computers over said network;

a program definition file for recording information defined by a user for programs cooperatively executed over said network; and a management process for managing operation of said programs cooperatively executed in accordance with said information recorded in said program definition file.

* * * * *